UNITED STATES PATENT OFFICE.

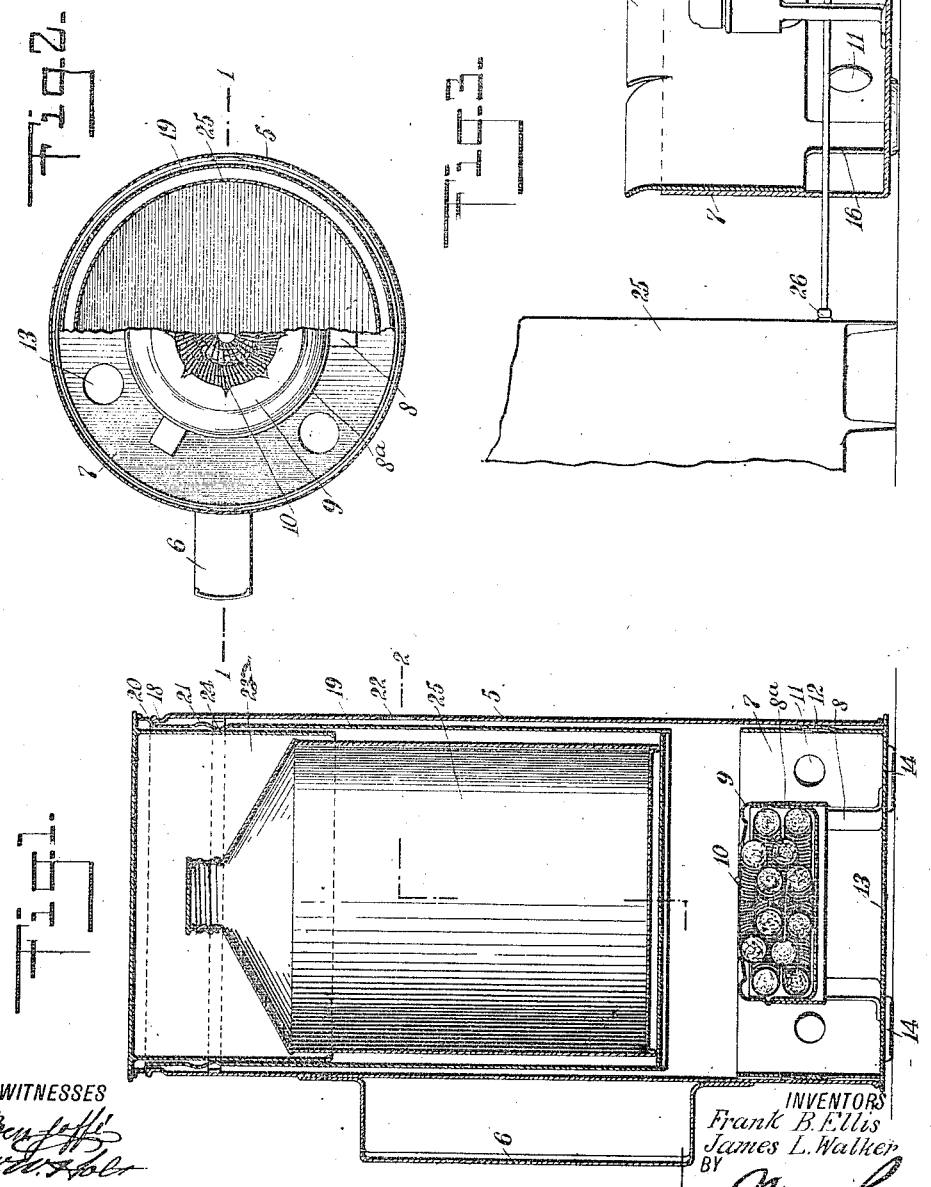

FRANK B. ELLIS AND JAMES L. WALKER, OF WHARTON, TEXAS.

PORTABLE HEATER.

986,272. Specification of Letters Patent. Patented Mar. 7, 1911.

Application filed November 8, 1909. Serial No. 526,766.

*To all whom it may concern:*

Be it known that we, FRANK B. ELLIS and JAMES L. WALKER, citizens of the United States, and residents of Wharton, in the county of Wharton and State of Texas, have invented a new and Improved Portable Heater, of which the following is a full, clear, and exact description.

The invention is an improvement in portable heaters and is designed for heating water for toilet and other purposes, or for use as a cooking stove in camping.

The invention has in view a heater having all of the essentials for heating water, cooking, etc., including a flask for the fuel, a vessel for holding the water or food, and an extra cup or receptacle, all adapted to fit within and be incased by the body or outer jacket of the heater when the heater is completely assembled.

Reference is to be had to the accompanying drawings forming a part of this specification, in which similar characters of reference indicate corresponding parts in all the views.

Figure 1 is a central vertical section of the preferred form of our improved heater, on the line 1—1 of Fig. 2; Fig. 2 is a cross-section of the same on the line 2—2 of Fig. 1; and Fig. 3 is a fragmentary section of a modified arrangement of the heater.

The invention more specifically described embodies an upright tubular body or jacket 5, having a suitable handle 6, by which the heater is moved from place to place. In the lower portion of the heater is slidably received a burner cup 7, having a stand 8, at the center provided with a ring support 8ª at the top, in which the lower portion of a burner case 9 fits, the burner case containing coiled therein a wire-wrapped wick 10, the wick being exposed through the upper open portion of the case, where it can be ignited. The burner cup 7 is provided with air inlet openings 11, to support the combustion of the fuel, and is frictionally retained in the lower portion of the jacket by stamping spring tongues 12, from the sides to protrude slightly outwardly. The burner cup also has air inlet openings 13 at the bottom, with flattened feet 14 on the under side, for elevating the openings 13 above the surface on which the heater is seated. The tubular support 15 closely fits within the burner cup 7 and projects above the top edge thereof, as shown in Fig. 3, the support having legs 16 to bear on the bottom of the burner cup, and constructed with outwardly-turned tongues 17 at the top, for the seating of a pan or other like vessel, the products of combustion passing out through the spaces 17ª between the tongues.

The top of the tubular body or jacket of the heater is constructed with a slightly contracted mouth, as indicated at 18, and receives a vessel or cup 19 suitable for heating water, the vessel having a shoulder 20 adapted to seat on the upper edge of the jacket and constructed with an outwardly-pressed bead 21 at a point therebelow, adapted to be sprung past the contracted mouth of the body of the heater when the vessel is removed or replaced, this feature of the construction preventing the vessel from dropping out when the heater is tilted to pour out the contents. The vessel when in place extends to a point slightly above the burner, in which position the water or food placed within the vessel is quickly heated, the burner, in the heating operation, being withdrawn from the body of the heater until the lower edge of the latter stands above the inlet openings 11. The burned gases escape from the burner through the annular space between the heater body and vessel, and the outlet openings 22 formed in the upper portion of the heater body.

A cup 23 serves as a top for the heater and seats on and closes the top of the vessel 19, the cup being frictionally retained in place by an inwardly-projecting bead 24 stamped in the wall of the vessel.

A flask or pan 25 adapted to contain the alcohol or other liquid fuel for the burner, is of a size to be contained within the vessel 19, and in event the heater is of a large size for cooking purposes, as when used as a feature of a camper's outfit, the flask may be provided at the lower portion with an outlet connection 26, by which it is connected to the burner, as shown in Fig. 3. The flask is also obviously adapted to be used as a container for coffee and other liquid food, especially in heating the latter within the vessel.

In Fig. 1, the tubular support 15 for a pan or similar cooking vessel is removed, as is preferably the case when the burner is used for heating the vessel 19.

Having thus described our invention, we claim as new and desire to secure by Letters Patent:

1. The combination in a portable heater, of an upright tubular body, a burner removably arranged in the lower portion of the body, a vessel seating on and fitting within the upper portion of the body, and an inverted cup serving as a cover for the heater, fitting within and closing the upper portion of the vessel and extending for approximately its full depth within the vessel.

2. The combination in a portable heater, of an upright tubular body, a burner carried by the body and arranged at the lower portion thereof, a vessel seating on the upper portion of the body and extending therein to a point near the burner, and a cup serving as a top for the heater, seating on and closing the vessel and extending for substantially its full depth into the vessel.

3. The combination in a portable heater, of an upright tubular body, a burner arranged within the lower portion of the body, a cooking vessel seating on and extending into the upper portion of the body, and beads in connection with the body and vessel to prevent the vessel from falling out when the body is inverted and adapted to be sprung past each other.

4. The combination in a portable heater, of an upright tubular body having an internal shoulder adjacent to its upper edge, a burner arranged within the lower portion of the body, and a cooking vessel extending into the upper portion of the body over the burner and having a shoulder at the top adapted to seat on the upper edge of the body and having a bead adapted to be sprung past the shoulder of the tubular body and arranged a substantial distance therebelow when the body and vessel are assembled.

In testimony whereof we have signed our names to this specification in the presence of two subscribing witnesses.

FRANK B. ELLIS.
JAMES L. WALKER.

Witnesses:
J. L. ABERNATHY,
G. S. GORDON.